United States Patent [19]
Blumenfeld et al.

[11] Patent Number: 5,490,163
[45] Date of Patent: Feb. 6, 1996

[54] METHOD OF OPERATION OF A D.C. ELECTRIC-ARC FURNACE WITH BOTTOM ELECTRODE AND REFRACTORY PART FOR ITS IMPLEMENTATION

[75] Inventors: Philippe Blumenfeld, Bousse; Philippe Destannes, Metz; Christian Lebrun, Saultain, all of France

[73] Assignee: Clecim (Societe anonyme), Cergy-Pontoise cedex, France

[21] Appl. No.: 271,899

[22] Filed: Jul. 8, 1994

[30] Foreign Application Priority Data

Jul. 9, 1993 [FR] France .................. 93 08650

[51] Int. Cl.⁶ ......................................... F27D 1/00
[52] U.S. Cl. .................................. 373/72; 373/108
[58] Field of Search ........................ 373/71, 72, 108

[56] References Cited

U.S. PATENT DOCUMENTS

| | | | |
|---|---|---|---|
| 4,592,066 | 5/1986 | Repetto et al. | 373/72 |
| 4,601,041 | 7/1986 | Muller | 373/72 |
| 4,628,516 | 12/1986 | Voss-Spilker et al. | 373/72 |
| 4,697,273 | 9/1987 | Cordier | 373/72 |
| 4,754,464 | 6/1988 | Feuerstake | 373/72 |
| 4,947,405 | 8/1990 | Okada | 373/72 |
| 5,371,759 | 12/1994 | Wells et al. | 373/72 |

FOREIGN PATENT DOCUMENTS

| | | |
|---|---|---|
| 0124490 | 11/1984 | European Pat. Off. . |
| 0125200 | 11/1984 | European Pat. Off. . |
| 0178981 | 4/1986 | European Pat. Off. . |
| 2149279 | 6/1985 | United Kingdom . |

*Primary Examiner*—Tu Hoang
*Attorney, Agent, or Firm*—Sixbey, Friedman, Leedom & Ferguson

[57] ABSTRACT

The method relates to the operation of a D.C. electric-arc furnace provided with at least one bottom electrode including an elongated metal current-supply body passing through the hearth of the furnace and surrounded by a casing made of dense refractory substance, comprising at least one shell ring whose upper end comes into contact with the molten metal in the furnace. During restarting of the furnace after shut-downs, a free expendable annular part made of refractory material, of flattened general shape, is placed on the upper end of the shell ring, which part extends it upwards and is intended to come into contact with the molten metal instead of said shell ring. The method applies in particular to D.C. electric-arc furnaces for the manufacture of steel, and is intended to reduce wear on the refractory parts surrounding the bottom electrode.

8 Claims, 2 Drawing Sheets

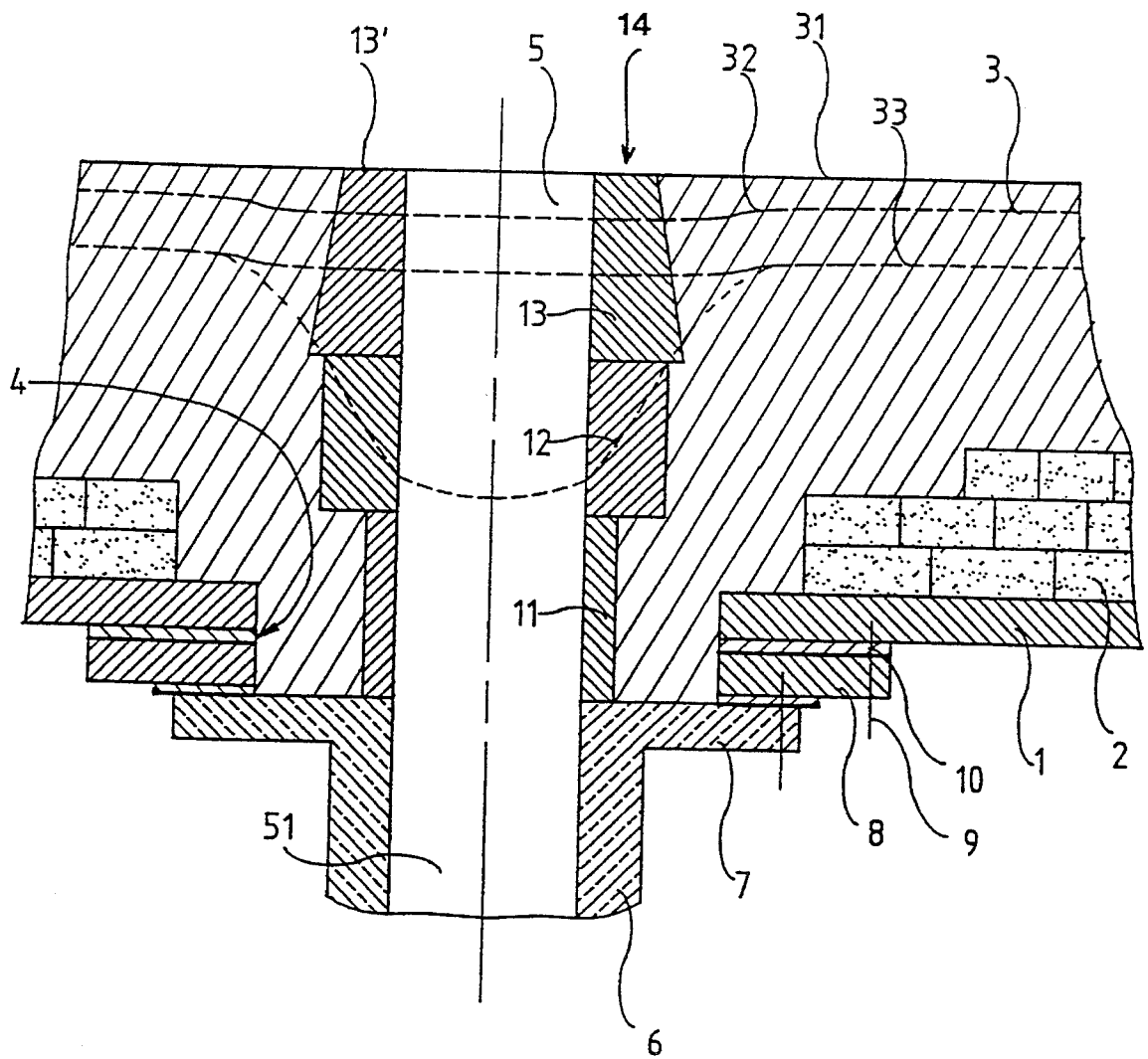
Fig. -1-
PRIOR ART

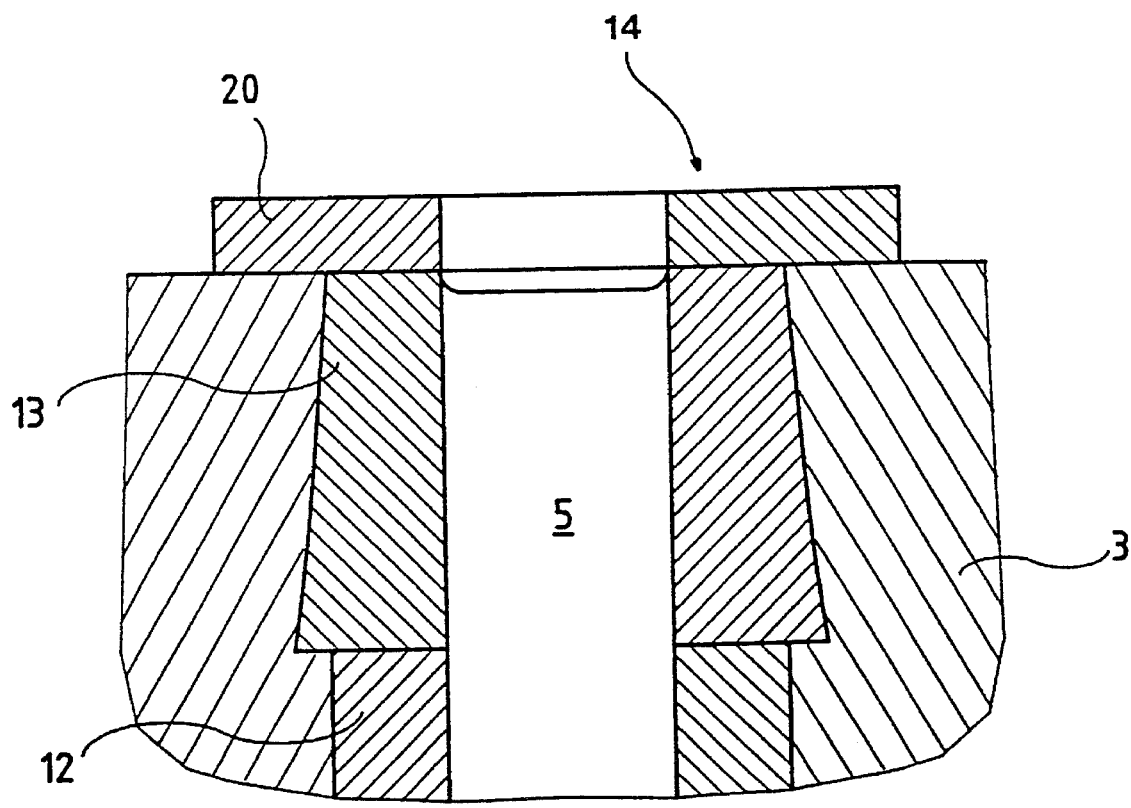
Fig.-2-

METHOD OF OPERATION OF A D.C. ELECTRIC-ARC FURNACE WITH BOTTOM ELECTRODE AND REFRACTORY PART FOR ITS IMPLEMENTATION

FIELD OF THE INVENTION

The present invention relates to the operation of a D.C. electric-arc furnace for melting metals, especially steel, the path for the current of which is provided by at least one cooled bottom electrode passing through the bottom of the furnace. More particularly, the invention relates to procedures intended to extend the lifetime of this bottom electrode.

PRIOR ART

It is known to use, in furnaces of this type, a cooled bottom electrode consisting of an elongated metal body, generally made of steel, which passes through the bottom of the furnace while having its end flush with the upper surface of the hearth of the furnace in order to come into contact with the metal in the furnace, and which is connected via its other end, extending below the furnace shell, to a D.C. source.

On contact, the metal charge to be melted in the furnace is thus raised to an electrical potential whose difference with the potential of a graphite roof electrode, placed at a controlled distance below and connected to the same current source, is such that an electric arc is set up between the charge to be melted and the free end of the roof electrode.

The elongated body which forms the bottom electrode is mechanically bonded to the shell of the furnace by a fastening device which also provides the electrical connection between the elongated body and the electrical supply. This device includes, for example, a copper sleeve which is cooled by intense circulation of water on its outer face and which surrounds the lower end of the elongated body extending below the shell of the furnace, this sleeve being electrically insulated from the furnace shell onto which it is fastened.

It is also known that this device consists, in conjunction with the aforementioned sleeve (EP-A 0,178,981) or separately (U.K. Pat. app. 2,149,279), of an internally cooled copper plug which extends downwards the elongated body with which it is intimately connected in order to ensure good electrical connection.

That part of the elongated body which passes through the hearth of the furnace is surrounded by a casing made of dense refractory substance which, like the elongated body, emerges at the surface of the hearth and which consists of a shell ring or several stacked shell rings, depending on the thickness of the refractory lining of the furnace. This casing thus forms a well of refractory substance which makes it possible to contain the liquefied metal resulting from the melting of the upper part of the elongated body during the operation of the furnace. This achieves confinement of this volume of molten steel which would otherwise rapidly infiltrate into the hearth of the furnace. The level of the melting front (boundary between the bottom solid part and the molten part of the elongated body) varies depending on the height of this well which, by wear of the upper surface in contact with the metal in the furnace, tends to decrease simultaneously with the thickness of the refractory hearth of the furnace during an operating campaign. However, this level normally remains always above the lower end of the refractory well, owing to the thermal holding provided by the cooling of the lower protruding part of the bottom electrode immediately below the refractory casing. The result of this is that the liquid metal coming from the partial melting of the elongated body always remains contained in this refractory well which is plugged towards the bottom by the solid portion of the elongated body.

During the use of such furnaces, unavoidable wear occurs on the refractory hearth, which is generally a rammed hearth. A conventional means of compensating for this wear is to re-lay on the worn hearth a layer of ramming substance, which operation is generally carried out during programmed shut-downs of the installation.

It has, however, been observed that the refractory shell ring surrounding the upper end of the elongated body undergoes wear faster than the rest of the hearth, which results in the formation of a wide hollow at the location of the hearth where the bottom electrode emerges. Furthermore, this wear tends to increase without it being possible to compensate for it by adding ramming substance.

The shell ring must therefore be replaced relatively frequently, which requires an extended shut-down of the furnace and demolition and reconstruction of the rammed hearth, at least in the vicinity of the bottom electrode.

SUMMARY OF THE INVENTION

The object of the invention is to limit or even prevent wear on the upper shell ring, in order to extend the lifetime of the shell rings and of the hearth in its entirety, and to reduce the operational shut-downs and the costs incurred due to complete reconstruction of the hearth.

With these purposes in mind, the object of the invention is a method of operation of a D.C. electric-arc furnace, through the hearth of which passes at least one cooled bottom electrode comprising an elongated metal current-supply body, surrounded in that part of it which passes through the hearth by a casing of dense refractory substance emerging at the surface of the hearth and consisting of at least one shell ring, in which method, during restarting of the furnace after shut-downs, a free expendable annular part made of dense refractory substance is placed on the upper end of said shell ring, which part extends it upwards in order to come into contact with the molten metal in the furnace instead of said shell ring.

As can be seen, the invention therefore consists in making the upper end of the refractory casing surrounding the bottom electrode and intended to come into contact with the molten metal in the furnace in the form of a free expendable refractory component which is easy to replace, because it is simply placed on the bottom of the furnace. Thus, a further object of the invention is such a component as defined in the claims hereinbelow, as well as entire refractory casing comprising this component.

By virtue of the invention, it was possible to observe a marked decrease in the rate of wear. This rate, which is of the order of 0.5 mm thickness reduction of the hearth around the electrode per casting, on average, according to the prior art, drops to only 0.2 mm per casting when employing the method according to the invention.

BRIEF DESCRIPTION OF THE DRAWINGS

The invention will be better understood and other features and advantages will emerge from the description which will be given thereof with reference to the plates of attached drawings, in which:

FIG. 1 is a partial view in section, along the axis of the bottom electrode of said furnace, FIG. 2 is a view showing the annular wearing part positioned on the refractory shell ring before restarting of the furnace.

DESCRIPTION OF THE PREFERRED EMBODIMENTS

FIG. 1 shows only the part of the furnace neighbouring the bottom electrode. The furnace comprises a shell with a metal carcass 1 lined on the inside with bricking 2 and refractory ramming substance 3 forming the hearth.

In the zone where the bottom electrode is installed, the carcass 1 carries a reinforcing flange 8 which is fixed to it by bolts (shown by their axes 9), with interposition of an electrically insulating plate 10. The assembly comprising the carcass 1 and the flange 8 includes a circular orifice 4 through which an elongated steel body 5 passes, the upper end of which emerges at the surface 31 of the layer of ramming substance 3 on the bottom of the furnace. The lower end 51 of the elongated body 5 protrudes from the bottom of the furnace and is surrounded by a cooled copper sleeve 6 fastened on the flange 8 by its upper end 7. This sleeve also contributes to the electrical connection of the elongated body 5 with the D.C. source, not shown. The assembly constituted by the elongated body 5 and the cooled sleeve 6 forms the essential part of the construction of the bottom electrode.

Above the sleeve 6, the elongated body 5 is surrounded by a casing 14 made of dense refractory substance (vibrated material, for example) extending over the entire thickness of the hearth. The casing is here formed by stacking three shell rings 11, 12 and 13 which are held in place by the ramming substance 3 which surrounds them. This casing 14 forms a well which contains the liquid metal resulting from the partial melting of the elongated body 5 during the operation of the furnace.

In the case of new furnaces (or after complete reconstruction of the hearth with replacement of the elongated body 5 and the refractory shell rings 11, 12, 13) the upper end 13' of the upper shell ring 13 is flush with the surface 31 of the ramming substance 3. During use of the furnace, wear occurs on the hearth 3 and on the upper part of the upper shell ring 13.

FIG. 1 schematically represents, by the broken line 32, the profile of wear of the hearth after 300 castings, during use of the furnace before implementation of the invention, and, by the line 33, the highly flared profile obtained under the same conditions after 1300 castings. It can be observed that, after 300 castings, the wear on the upper shell ring 13 is greater than that on the ramming substance 3 constituting the rest of the hearth. After 1300 castings, the wear, which is very great, even affects the second shell ring 12, and is manifested by a widely flared hollow shape at the shell rings, while the wear on the layer of ramming substance 3 remains substantially uniform.

It will be noted that, because of this wear, the liquid metal coming from the melting of the charge of the furnace and of the elongated body 5 completely fills the cavity thus formed, covers the upper edge of the shell rings and comes into direct contact with the ramming substance 3.

When the furnace is emptied, solidified metal often remains attached to the surface of the flared part. The result of this is that the ramming substance then laid at this location necessarily covers these fragments of solidified metal. On subsequent restarting of the furnace, when these fragments are remelted, the ramming substance laid which is not joined to the shell rings or to the underlying ramming substance, is rapidly detached and the wear on the shell rings and on the neighbouring ramming substance is thereby increased.

The method according to the invention, which aims to eliminate or at least to reduce this strong wear of the refractory shell rings, is employed in the following manner.

During programmed shut-downs of the furnace, usually at the end of the week, the last charge of molten metal is emptied from the furnace. Care is taken that the level of molten metal contained in the refractory well formed by the casing 14 lies below the upper edge 13' of the remaining part of the upper shell ring 13, so as to avoid as much as possible detachment of metal on this upper edge of the shell ring 13. Before restarting the furnace, an interchangeable annular part 20 made of refractory material is placed on this shell ring, coaxially with it and with the best possible contact between them, as represented in FIG. 2.

This annular part forms a free expendable component extending the underlying shell ring (their internal diameters being preferably substantially equal) and it being sufficiently thick, on the one hand, to provide its mechanical strength and, on the other hand, to limit the heat flux which can pass through it in its thickness direction.

In fact, this annular part is essentially intended to prevent the thermal shock which, in its absence, would be suffered by the upper part of the shell ring 13. It has, in fact, been possible to demonstrate that the strong wear on the upper shell ring 13 mentioned hereinabove essentially results from splintering by horizontal crack formation of the refractory constituting the shell ring. This damage appears due to the thermal shocks resulting from the upper edge of the shell ring coming into abrupt contact with the hot molten steel coming from the first quantities of scrap which are melted during restarting of the furnace, while the refractory substance of the shell ring located further down, as well as the elongated metal body 5, are still at low temperature because of the cooling which takes place during the shut-down.

The annular part 20, fitted according to the invention, prevents the molten metal from entering into direct contact with the upper edge of the shell ring 13, during restarting of the furnace. The thermal shock is taken by this annular part which withstands for a sufficiently long time for the upper shell ring 13 to have had time to heat up by conduction in contact with the elongated body 5 which itself heats up fairly quickly as soon as the charge of the furnace has started to melt.

It should be noted that the annular part 20 is not a "wearing part" in the commonly accepted sense of this expression, but a sacrificial protective part intended to temporarily protect the shell ring, on restarting of the furnace. In fact, the annular part 20 is not intended to compensate for the normal wear on the shell ring which inevitably occurs during use of the furnace. This annular part, which provides provisional protection of the upper part of the shell ring, moreover breaks down fairly quickly on melting of the first charge of the furnace, because it is this part which takes the thermal shock mentioned above. Destruction of this part is, moreover, no problem so long as it is completed only after the shell ring has reached normal operating temperature: the lifetime of this part may, for example, be only a few hours.

The substance of the annular part 20 may thus be an ordinary refractory material which is much less expensive than the substance constituting the shell ring.

It is possible to use either a refractory material having good thermal insulation properties, in which case the thickness of the annular part may be reduced, or, conversely, to use a thicker part made of a less insulating material.

Preferably, this annular part is in the form of a collar. Its external diameter is then substantially greater than that of the shell ring 13 on which it is placed, so as to cover the neighbouring ramming substance. This prevents possible infiltration, between the shell ring and the neighbouring ramming substance, of the metal from the charge liquefied at the start of the melting.

It will also be noted that the fitting of the annular material part (20) will be carried out during shut-down of the furnace before restarting, so long as the length of the shut-down has been sufficient to allow substantial cooling of the casing 14. In fact, it has been observed that, if said annular part has not been fitted at the time of a restart and even if it has been reused during subsequent start-ups, the shell ring 13 can then suffer a high degree of wear. This is due to the fact that, as a result of the absence of the annular part 20, the upper edge of the shell ring 13 is eroded irregularly, in particular in the flared shape described previously. In consequence, when the annular part 20 is again used, zones remain between it and the underlying shell ring 13 into which the liquid metal can infiltrate at the start of the melting and again cause the thermal shock which generates rapid wear on the shell ring.

The invention is not, however, limited to the systematic fitting of the annular piece on each restart, insofar as the effects of the thermal shock are not produced, or are negligible, if it has been possible to keep the temperature of the shell ring sufficiently high.

We claim:

1. A method of operating a D.C. electric-arc furnace, said furnace having a bottom through which at least one bottom electrode is implanted, said bottom electrode including an elongated metal current-supply body, which is surrounded, in that part of it which passes through the bottom, by a casing of dense refractory substance including at least one annular shell ring coaxially surrounding said metal body and having an upper end flush with an upper surface of the bottom, comprising the steps of:

placing an expendable annular part consisting of refractory material on said upper end of the shell ring and coaxially with said shell ring at the time of preparing a restarting of the furnace after a shutdown, said annular part extending upwards from the shell ring;

placing a charge to be melted into the furnace upon said bottom, and restarting the furnace to melt said charge, the annular part being placed so that liquid metal resulting from the first melting of the charge comes into contact with the annular part instead of the upper end of the shell ring.

2. A method of operating a D.C. electric-arc furnace as claimed in claim 1, wherein upon a shutdown of the furnace, molten metal is emptied from the furnace so that the level of molten metal contained in the casing lies below the upper end of the shell ring.

3. An expendable annular part to be placed in a D.C. electric-arc furnace for protecting said furnace from thermal shock, said furnace having a bottom through which at least one bottom electrode is implanted, said bottom electrode having an elongated metal current-supply body, which is surrounded, in that part of it which passes through the bottom, by a casing of dense refractory substance including at least one annular shell ring oriented coaxially with said metal body and having an upper end flush with an upper surface of the bottom, comprising an annular part having an internal diameter substantially equal to the inner diameter of the shell ring and being made from a dense refractory material for covering and protecting an upper portion of said annular shell ring from thermal shock during a start-up operation.

4. An expendable annular part to be placed in a D.C. electric-arc furnace for protecting said furnace from thermal shock, said furnace said furnace having a bottom through which at least one bottom electrode is implanted, said bottom electrode including an elongated metal current-supply body, which is surrounded, in that part of it which passes through the bottom, by a casing of dense refractory substance consisting of at least one annular shell ring oriented coaxially with said metal body and having an upper end flush with an upper surface of the bottom, comprising an annular part having an internal diameter substantially equal to the inner diameter of the shell ring and being made of a thermally insulating refractory material for covering and protecting an upper portion of said annular shell ring from thermal shock during a start-up operation.

5. An expendable annular part as claimed in claim 4 having an external diameter that is substantially greater than that of said shell ring.

6. A D.C. electric-arc furnace comprising a bottom through which at least one bottom electrode is implanted, said bottom electrode including an elongated metal current-supply body, which is surrounded, in that part of it which passes through the bottom, by a casing of dense refractory substance including at least one annular shell ring coaxially oriented with said metal body and having an upper end flush with an upper surface of the bottom, and an expendable annular part made of dense refractory placed on said upper end of the shell ring in coaxial relationship for protecting the upper end of the shell ring from thermal shock, said annular part extending upwards from the shell ring.

7. A D.C. electric-arc furnace as claimed in claim 6, wherein the bottom comprises a ramming substance surrounding said shell ring and the annular part is shaped in the form of a collar at the upper end of the shell ring, its external diameter being substantially greater than that of the shell ring so as to cover the neighboring ramming substance.

8. A bottom electrode casing for a D.C. electric-arc furnace, said furnace having a bottom through which at least one bottom electrode is implanted, said bottom electrode including an elongated metal current-supply body, which is surrounded by said casing in that part of it which passes through the bottom, said casing comprising at least one annular shell ring formed of a dense refractory substance and coaxially surrounding said metal body and having an upper end flush with an upper surface of the bottom, and an expendable annular part made of dense refractory material and being placed coaxially on said upper end of the shell ring for protecting said shell ring from thermal shock during a furnace start-up operation.

* * * * *